(No Model.)
J. COCHRAN.
SPOUT AND STRAINER.
No. 283,207. Patented Aug. 14, 1883.
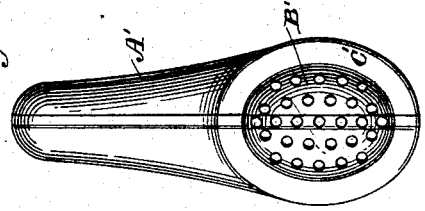
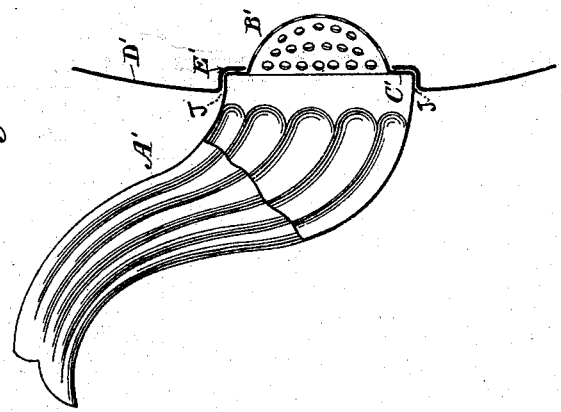
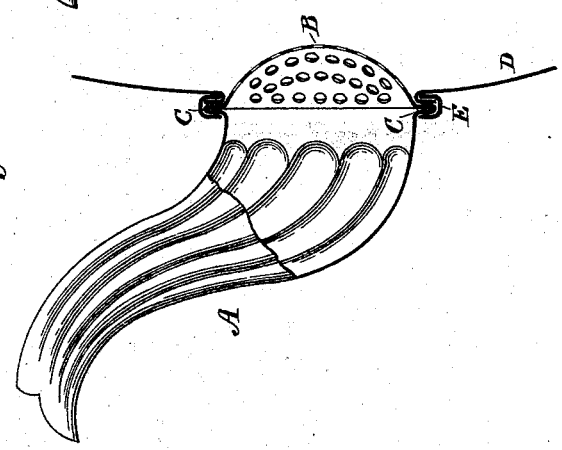
WITNESSES
INVENTOR

UNITED STATES PATENT OFFICE.

JAMES COCHRAN, OF NEW LOTS, NEW YORK.

SPOUT AND STRAINER.

SPECIFICATION forming part of Letters Patent No. 283,207, dated August 14, 1883.

Application filed May 4, 1883. (No model.)

*To all whom it may concern:*

Be it known that I, JAMES COCHRAN, a citizen of the United States, residing at the town of New Lots, in the county of Kings and State of New York, have invented a new and useful Improvement in Spouts and Strainers, of which the following is a specification.

My invention relates to that class of tea and coffee pots or similar vessels made of sheet metal and provided with a spout for directing the outflow of the contents, and a strainer placed so as to prevent the escape of any grounds or sediment with the liquid.

Prior to my invention sheet-metal tea and coffee pots and like vessels have been provided with spouts of a like material, made so that when placed over the hole in the wall of the vessel and fastened thereon by solder or otherwise it has been necessary, in order to prevent the grounds or solid extraneous matter from passing out with the liquid, to provide independent straining devices adapted to be secured in or over the orifice in the wall of the vessel where the spout enters. The disadvantage of this method lies in the fact that two or more operations are necessary: first, fastening the spout to the outer wall of the vessel, and, second, providing independent strainers to be secured on the inside. When the last-named is done by the ordinary method of soldering, it is somewhat of a difficult process, and requires considerable time, owing to the small aperture at the top of such vessels as tea and coffee pots through which the operation is performed. My invention is designed to overcome these objections by forming the strainer out of the same piece of metal, longitudinally, as composes the body of the spout, thus dispensing with independent or separate strainers, and at the same time provide a neat, durable, and efficient article at a reduced cost of manufacture. I accomplish this by forming or stamping, with suitable dies, sheet-metal spouts with the base or lower extremity perforated with a suitable number of small holes, the perforated part being of such a shape as to extend within the body of the vessel, thus forming a strainer, as will be hereinafter more fully set forth.

In the accompanying drawings, which illustrate my invention, Figure 1 represents the wall of a vessel in side elevation to which my invention has been applied. Fig. 2 represents certain modifications of construction. Fig. 3 is a rear elevation of the spout and perforated base.

Similar letters indicate like parts in the several views.

Referring to accompanying drawings, Fig. 1, D is a vertical longitudinal wall of a vessel having an aperture formed in its side.

A is a spout formed of one or more longitudinal pieces of sheet metal, with perforations B formed in its lower extremity, the perforated portion being designed to enter the body of the vessel, and may be of any desired shape, so as to present, if necessary, an extended strainer-surface not liable to choke up or seriously affect the flow of liquid to the spout A.

C is a ridge or corrugation formed on spout A, adjoining the strainer portion B, and enables the spout to be secured to the vessel without the use of solder. This is accomplished by turning a flange out on the edge of the aperture in wall D. A collar, E, is secured thereto and encircles the ridge or corrugation C. A joint thus formed may be finished by enameling or otherwise.

Figs. 2 and 3 (rear elevation) show an annular shoulder, C', formed on spout A'. This shoulder will enable the spout, when soldered at point J, to fit various size openings in the wall of the vessel. A very neat joint can be obtained by forming an annular depression, E', round the orifice in the wall of the vessel, in which the annular shoulder C' will fit, thus securing broad bearing-surfaces and entering angles, which are less liable to leakage under ordinary conditions of use.

The drawings show but one form of spout; but it is understood that the general shape may be indefinitely varied without departing from the spirit of my invention, the gist of which lies in the broad idea of combining the spout A and strainer B of the same piece of sheet metal.

What I claim as new, and desire to secure by Letters Patent, is—

1. As an article of manufacture, a combined spout and strainer for vessels, made of two pieces joined longitudinally, made of the same metal, and forming an integral part thereof, substantially as described.

2. A sheet-metal spout perforated with a suitable number of small holes at its base or lower extremity, said perforations being on the same metal and forming an integral part of the body of said spout, and an encircling corrugation or shoulder formed on the body of said spout, adjacent to said strainer, in combination with the shell of a tea-pot or other vessel, substantially as and for the purpose herein specified.

3. The combination, substantially as herein described, of the body of a tea or coffee pot or other vessels having an aperture formed in its side, a depression or recess formed on the edge of said apertures, and a combined spout and strainer, made of two pieces joined longitudinally, with an encircling shoulder, forming the shoulder of the strainer, adapted to fit in said recess, in the manner set forth.

In testimony whereof I have hereunto subscribed my name this 30th day of March, A. D. 1883.

JAMES COCHRAN.

Witnesses:
JOHN WALLACE,
WM. R. TUCKER.